US005781859A

United States Patent [19]
Beasley

[11] Patent Number: 5,781,859
[45] Date of Patent: Jul. 14, 1998

[54] RF REPEATER ARRANGEMENT WITH IMPROVED FREQUENCY REUSE FOR WIRELESS TELEPHONES

[75] Inventor: Andrew Beasley, Lake Errock, Canada

[73] Assignee: PCS Solutions, LLC, Englewood Cliffs, N.J.

[21] Appl. No.: 720,224

[22] Filed: Sep. 26, 1996

Related U.S. Application Data

[63] Continuation of Ser. No. 622,934, Mar. 27, 1996, which is a continuation of Ser. No. 188,752, Jan. 31, 1994, abandoned.

[51] Int. Cl.$^6$ .................................................. H04Q 7/20
[52] U.S. Cl. ...................... 455/423; 455/11.1; 455/15; 455/517
[58] Field of Search ................................ 455/7, 9, 11.1, 455/15, 67.1, 69, 423, 432, 436, 517, 524, 562; 370/315

[56] References Cited

U.S. PATENT DOCUMENTS

| | | |
|---|---|---|
| 4,234,959 | 11/1980 | Andrea, III et al. |
| 4,596,042 | 6/1986 | Stangl. |
| 4,719,619 | 1/1988 | Crookshanks ............................ 370/70 |
| 4,790,000 | 12/1988 | Kinoshita ................................ 379/59 |
| 5,067,147 | 11/1991 | Lee ........................................ 379/60 |
| 5,093,923 | 3/1992 | Leslie ..................................... 455/9 |
| 5,303,287 | 4/1994 | Laborde .................................. 455/33.2 |
| 5,321,736 | 6/1994 | Beasley ................................... 455/11.1 |
| 5,485,486 | 1/1996 | Gilhousen et al. ....................... 375/205 |

FOREIGN PATENT DOCUMENTS

| | | |
|---|---|---|
| 2059370 | 7/1992 | Canada. |
| 0112409 | 7/1984 | European Pat. Off.. |
| 0240051 | 10/1987 | European Pat. Off.. |
| 0421602 | 4/1991 | European Pat. Off.. |
| 0442259 | 8/1991 | European Pat. Off.. |
| 2482339 | 11/1981 | France. |
| 0191623 | 8/1991 | Japan ..................................... 455/33.2 |
| 2144309 | 2/1985 | United Kingdom. |

*Primary Examiner*—Dwayne Bost
*Assistant Examiner*—Nay Maung
*Attorney, Agent, or Firm*—Schwegman, Lundberg, Woessner & Kluth, P.A.

[57] ABSTRACT

An RF repeater arrangement for use in a wireless telephone system has a number of handset interface parts, each provided with a transmit section for transmitting a signal to a wireless telephone handset, a receive section for receiving an off-air signal from the wireless handset and an energy detector for detecting the energy level of the received off-air signal and providing a control signal corresponding to such energy level. The control signal is employed for inhibiting the transmit section when the energy level of the received off-air signal is below a predetermined value. Thus, each handset interface part can determine when a channel is occupied and avoid transmission on that channel, so that only the geographic area around the occupied handset is subject to interference from the occupied channel.

6 Claims, 11 Drawing Sheets

FIG. I

RF REPEATER ARRANGEMENT WITH IMPROVED FREQUENCY REUSE FOR WIRELESS TELEPHONES

This application is a continuation of application Ser. No. 08/622,934, filed Mar. 27, 1996, which is a continuation of application Ser. No. 08/188,752, filed Jan. 31, 1994, now abandoned.

BACKGROUND OF THE INVENTION

Field of the Invention

The present invention relates to RF repeater arrangements for use in wireless telephone systems and, more particularly, for linking basestations to wireless handsets in such systems.

The invention is useful in particular in wireless telephone systems using a cable television distribution plant for the transmission of radio frequency signals to and from wireless handsets and a basestation linked to the public switched telephone network. Such basestations have signal transmitting and receiving equipment and control equipment and can be connected through a coaxial cable or other signal conduit to one or more RF repeaters, which interface with the wireless handsets, i.e. receive transmit signals from the basestation and broadcast them to wireless handsets as radio signals and also receive radio signals from the handsets and pass corresponding signals to the basestation. In this way, the RF repeaters can be utilized to increase substantially the area which can be served by the basestation.

It is in many cases advantageous to make such an RF repeater in two parts, i.e. a first part which interfaces with the basestation and a second part which interfaces with the handset. These two parts may be physically separated from one another by a long distance, e.g. several kilometers, and connected by a signal conduit in the form of co-axial cable or optical fiber cable.

Such RF repeaters can be connected to the common signal conduit in a number of ways. One way in which the RF repeaters may be connected is to allow all of the RF repeaters to transmit a common signal from the basestation and to allow all of the RF repeaters that are able to receive the handset signal to feed this received signal through the common signal conduit to the basestation.

This method of interconnecting has a number of advantages.

More particularly, this method is easy to implement and it enables the use of a distributed antenna arrangement which supports "roaming" of a handset from the coverage zone of an antenna into contiguous coverage zones of other antennas.

This method can also allow a simple form of channel frequency control. Thus, in many cordless handset protocols (e.g. CT-2), the radio signal channel is taken by a handset only if that channel is not in use. The handset therefore scans to ensure that the channel is free before opening communications. The channel is demand assigned.

Consequently, in this common method of interconnecting RF repeaters to the common signal conduit, the channel is demand assigned to the handset for the entire distributed antenna arrangement. The handset can therefore "roam" in the entire coverage zone of the distributed antenna arrangement without risk of other users trying to take the channel.

For example, in the CT-2 protocol, the handset scans for a free channel before initiating a call. Once the handset has established a call, the channel is occupied throughout the entire distributed antenna arrangement. Any other handsets that wish to communicate will ascertain that all of the RF repeaters are transmitting on a specific frequency and will thus deduce that the corresponding channel is occupied. The other handsets will therefore not attempt to use that occupied channel when initiating a call.

It is, however, a disadvantage of the above-described method of interconnecting RF repeaters that the geographic area around the entire distributed antenna arrangement will be subject to interference from the occupied channel.

SUMMARY OF THE INVENTION

It is accordingly an object of the present invention to provide a novel and improved RF repeater, for use in a wireless telephone system using a distributed antenna arrangement, which enables only the geographic area around a handset occupying a channel to be subjected to interference from the occupied channel.

According to the present invention, there is provided an RF repeater for use in a wireless telephone system, comprising means for transmitting a transmit signal to a wireless telephone set, means for receiving a receive signal from the wireless handset, means for detecting the energy level of the received off-air signal and providing a control output corresponding to such energy level and means responsive to the control output for enabling the transmitting means to transmit only when the energy level of the received off-air signal has reached a predetermined value.

The RF repeater arrangement of the invention thus allows the transmission of the signal message from the basestation, only if the RF repeater determines that the receive signal contains sufficient energy, i.e. if it determines that there is a handset in communication with it.

BRIEF DESCRIPTION OF THE DRAWINGS

Further objects, features and advantages of the present invention will become more readily apparent to those skilled in the art from the following description of the invention when taken in conjunction with the accompanying drawings, in which.

DESCRIPTION OF THE PREFERRED EMBODIMENT

Figure 1:
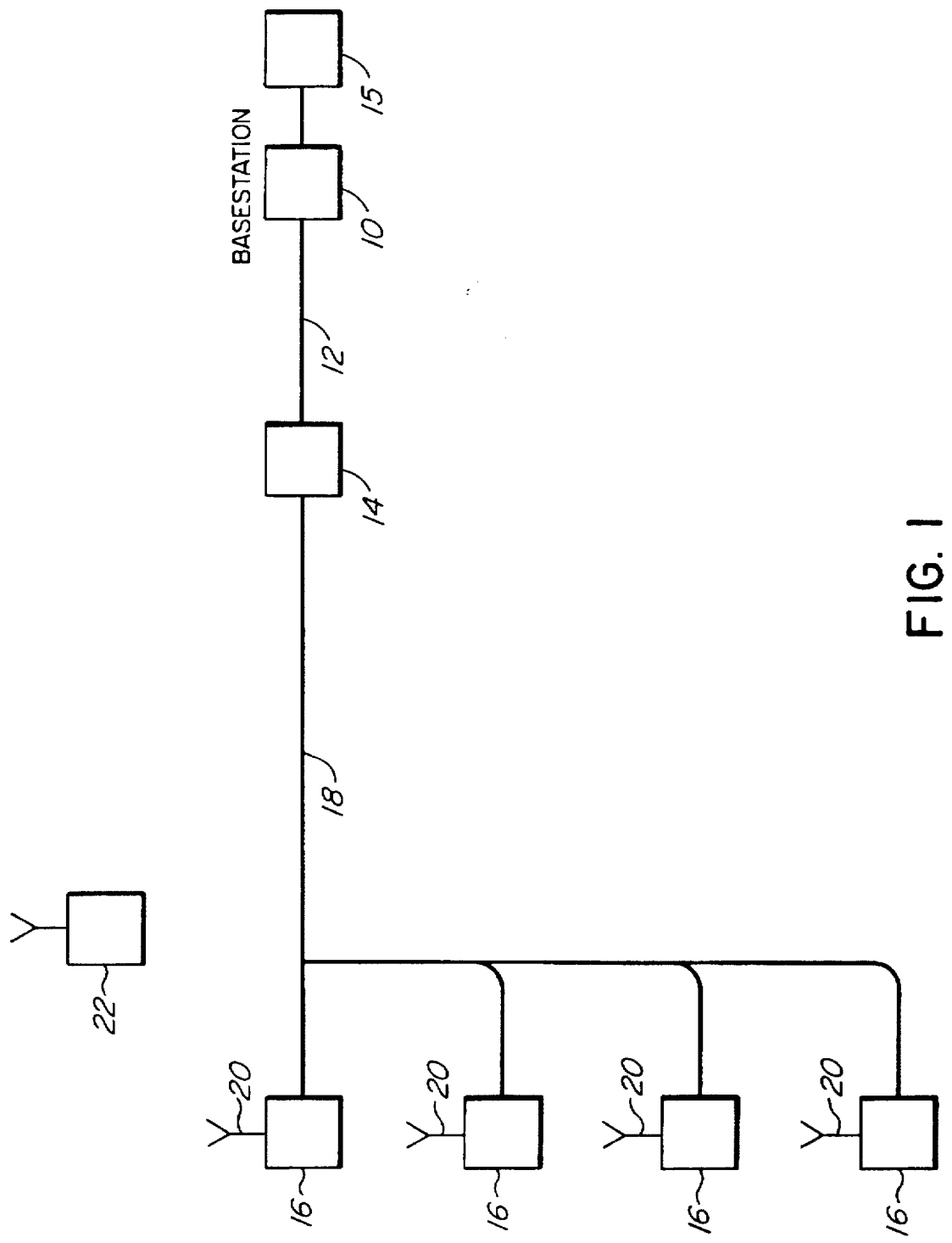
FIG. 1 shows an RF repeater arrangement in which the present invention is employed.

As shown in FIG. 1 of the accompanying drawings, a basestation 10 is connected by a coaxial cable 12 to a first or basestation interface part 14 of an RF repeater arrangement.

The basestation 10 contains transmitter and receiver equipment and control equipment for transmitting and receiving RF signals through the coaxial cable 12 and is connected to public switched telephone network 15. Since such basestations and telephony plant are well known in the art, they will not be described in greater detail herein.

The basestation interface part 14 of the RF repeater arrangement is connected to four second or handset interface parts 16 of the arrangement by a common signal conduit 18 in the form of coaxial and/or optic fiber cable, typically forming part of a cable television distribution system. It is however to be understood that, in practice, the number of the handset interface parts 16 will be substantially greater than the four illustrated in FIG. 1.

The handset interface parts 16 have antennas 20 for exchanging radio signals with any of a plurality of handsets, of which one is shown in FIG. 1 and is indicated generally by reference numeral 22.

Figure 2:
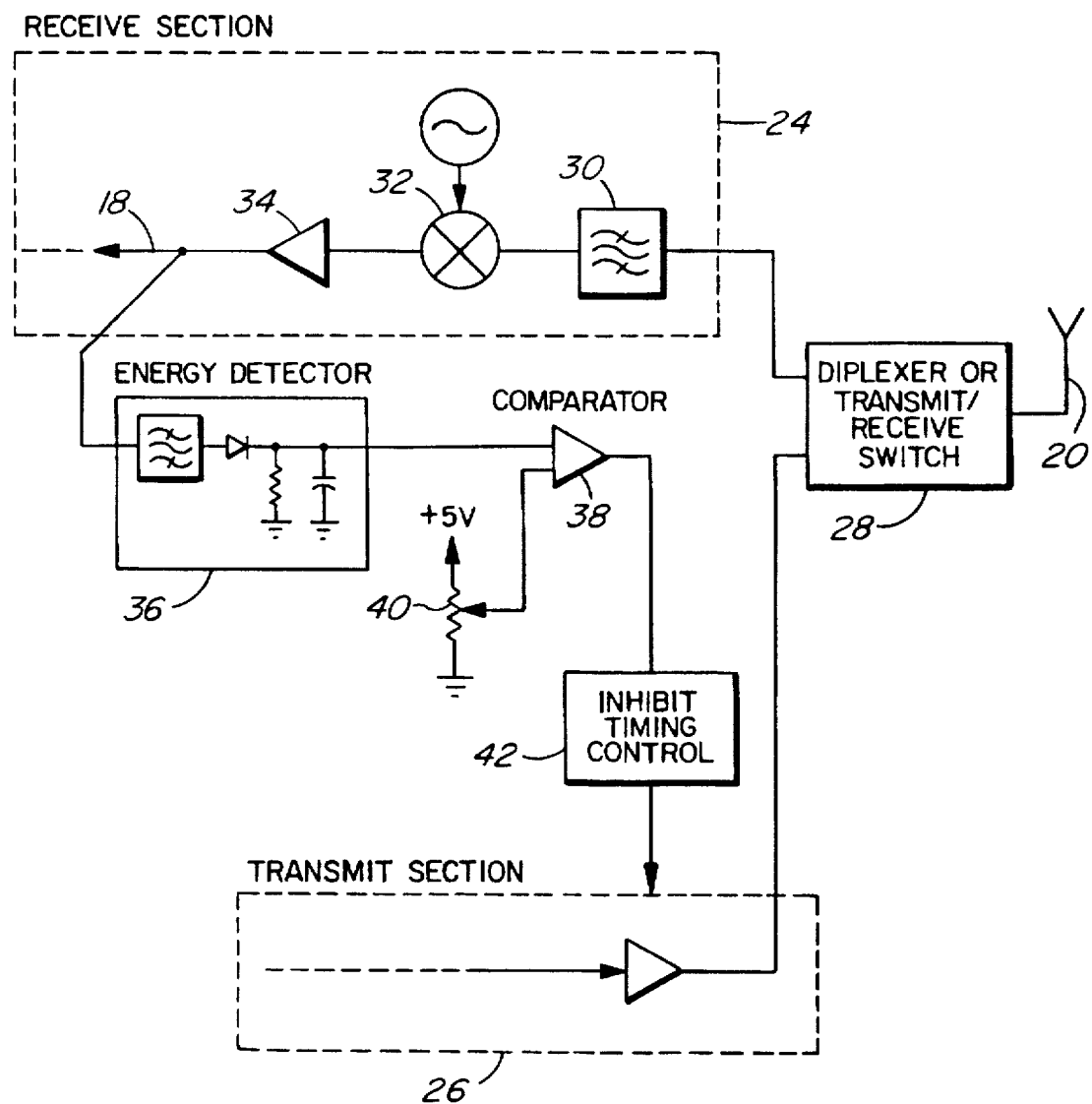
FIG. 2 shows a handset interface part of the RF repeater arrangement of FIG. 1 according to the present invention.

FIG. 2 shows in greater detail the components of one of the handset interface parts 16.

As shown in FIG. 2, the handset interface part of the RF repeater arrangement has a receive section 24 for receiving an off-air signal from the handset 22 and feeding this signal through the basestation interface part 14 to the basestation 10, and a transmit section 26 for receiving a signal from the basestation 10 through the basestation interface part 14 and transmitting this signal to the handset 22.

The antenna 20 is connected to the input of the receive section and the output of the transmit section 26 through a diplexer or transmit/receive switch 28.

The receive section 24 has a bandpass filter 30 for filtering the receive signal from the diplexer, followed by a mixer 32 for mixing with this signal a frequency generated by a crystal oscillator (not shown) or synthesizer (not shown).

The output from the mixer 32 is amplified by an amplifier 34 and fed to the co-axial cable 18 for transmission through the basestation interface part 14 of the RF repeater arrangement to the basestation 10.

The output of the amplifier 34 is also fed to an energy detector 36, which provides at its output a control voltage corresponding to the energy level of the receive signal from the handset 22.

A comparator 38 in the form of a differential amplifier is connected to compare the control voltage from the energy detector 36 and a reference voltage from an adjustable voltage divider indicated generally by reference 40. When the energy level of the receive signal from the handset 22 is below a predetermined value, the output of the comparator 38 inhibits the transmission operation of the transmit section 26 and thereby prevents the transmission of the transmit signal by this RF repeater handset interface part.

The comparator 38 is connected to the transmit section 26 through an inhibit and timing control device 42, which is described in greater detail below.

All of the RF repeater handset interface parts 16 may have a construction similar to that of FIG. 2.

Thus, each of the RF repeater handset interface parts 16 can transmit a signal message which comes from the basestation 10 only if it determines that the receive signal which it receives contains sufficient energy, i.e. if it is in communication with the handset 22.

This method of interconnecting RF repeaters is easy to implement and provides a distributed antenna arrangement which supports "roaming" of the handsets from one contiguous antenna coverage zone to another. However, only the geographic area around the handset which is in communication is subject to interference from the occupied channel. Consequently, only a very limited number of the RF repeater transmit simultaneously and thus cause frequency re-use problems.

Figure 3:
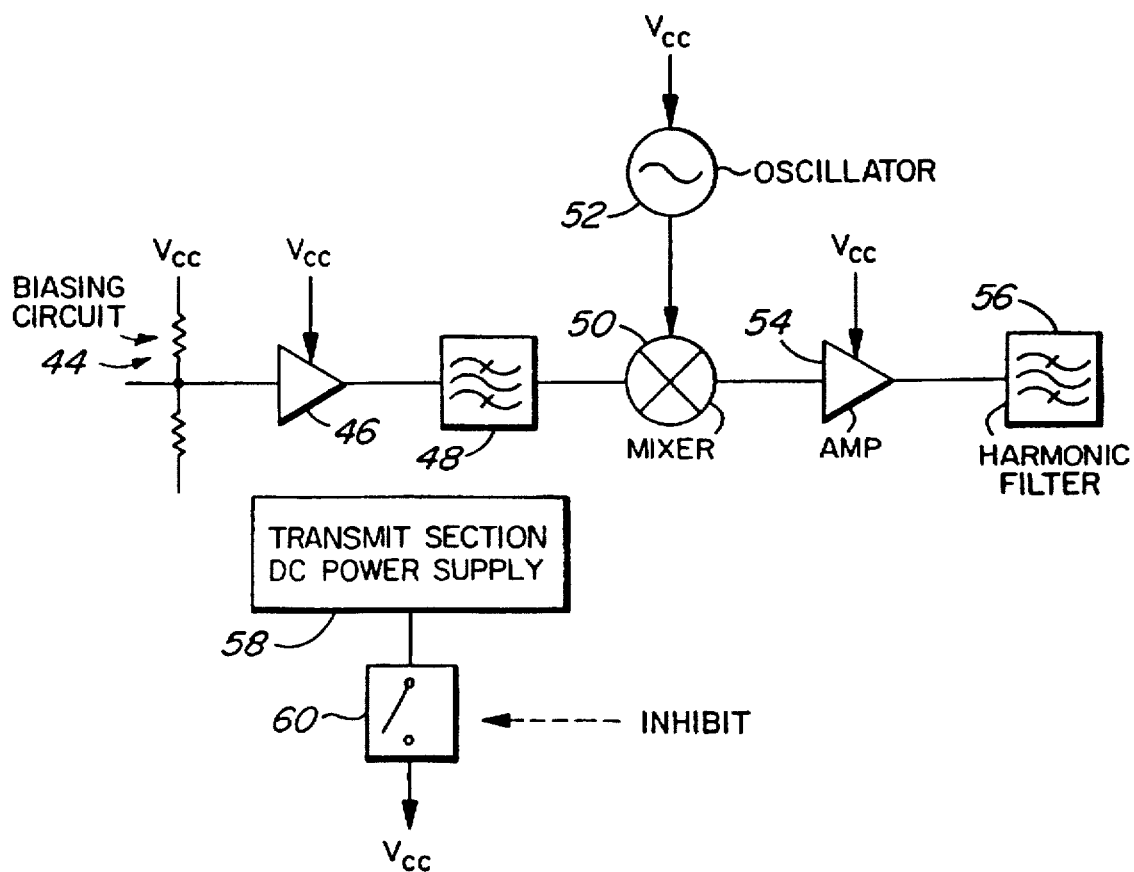
FIG. 3 shows a transmit section of the RF repeater part of FIG. 2.

FIG. 3 shows in greater detail the transmit section 26 of FIG. 2.

The coaxial cable 18, or a connecting cable extending from the cable 18, is connected to an amplifier 46, which is biased by a circuit 44 and the output of which is connected through a bandpass filter 48 to a mixer 50. An oscillator 52 connected to the mixer supplies a frequency for heterodyning the signal from the coaxial cable 18, which is then amplified by a further amplifier 54 and passed through a further bandpass filter 56 to the diplexer or transmit/receive switch 28.

The transmit section 26 includes a DC power supply 58, the output of which is connected through a solid state switch 60 to the biasing circuit 44, the amplifier 46, the oscillator 52 and the amplifier 54.

The operation of the switch 60 is controlled by the inhibit timing control device 42 so that, when the output of the energy detector 36 has not reached a sufficiently high value, the switch 60 is operated to inhibit the operation of the transmit section.

Figure 4:
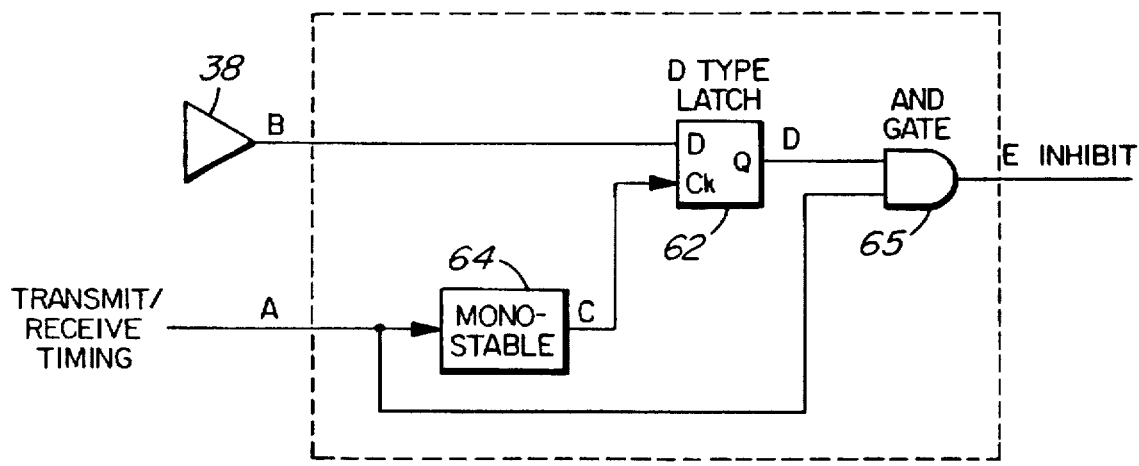
FIG. 4 shows an inhibit timing control device in the RF repeater part of FIG. 2.

The inhibit timing and control device 42, which is intended for use with time division duplex modulation formats and, more particularly, for inhibiting operation of the transmit section 26 during the time duplex interruptions of the receive signal from the handset, is illustrated in greater detail in FIG. 4, and has a D-type latch 62 having one input connected to the output of the comparator 38 and another input connected to the output of a monostable circuit 64. The monostable circuit 64 receives transmit/receive timing pulses, which are also applied to one input of an AND gate 65, which has its other input connected to the output of the D-type latch 62.

Figure 2A:
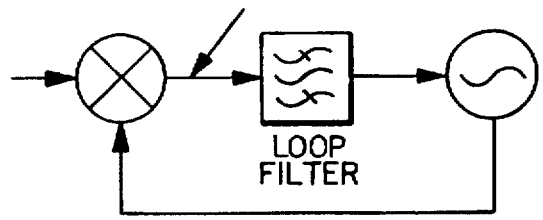
FIG. 2A shows a timing pulse generating circuit for use with the arrangement of FIG. 2.

The transmit/receive timing pulses are generated by the phase locked loop circuit of FIG. 2A, which has a mixer 67, a loop filter 69 and an oscillator 71.

Figure 5:
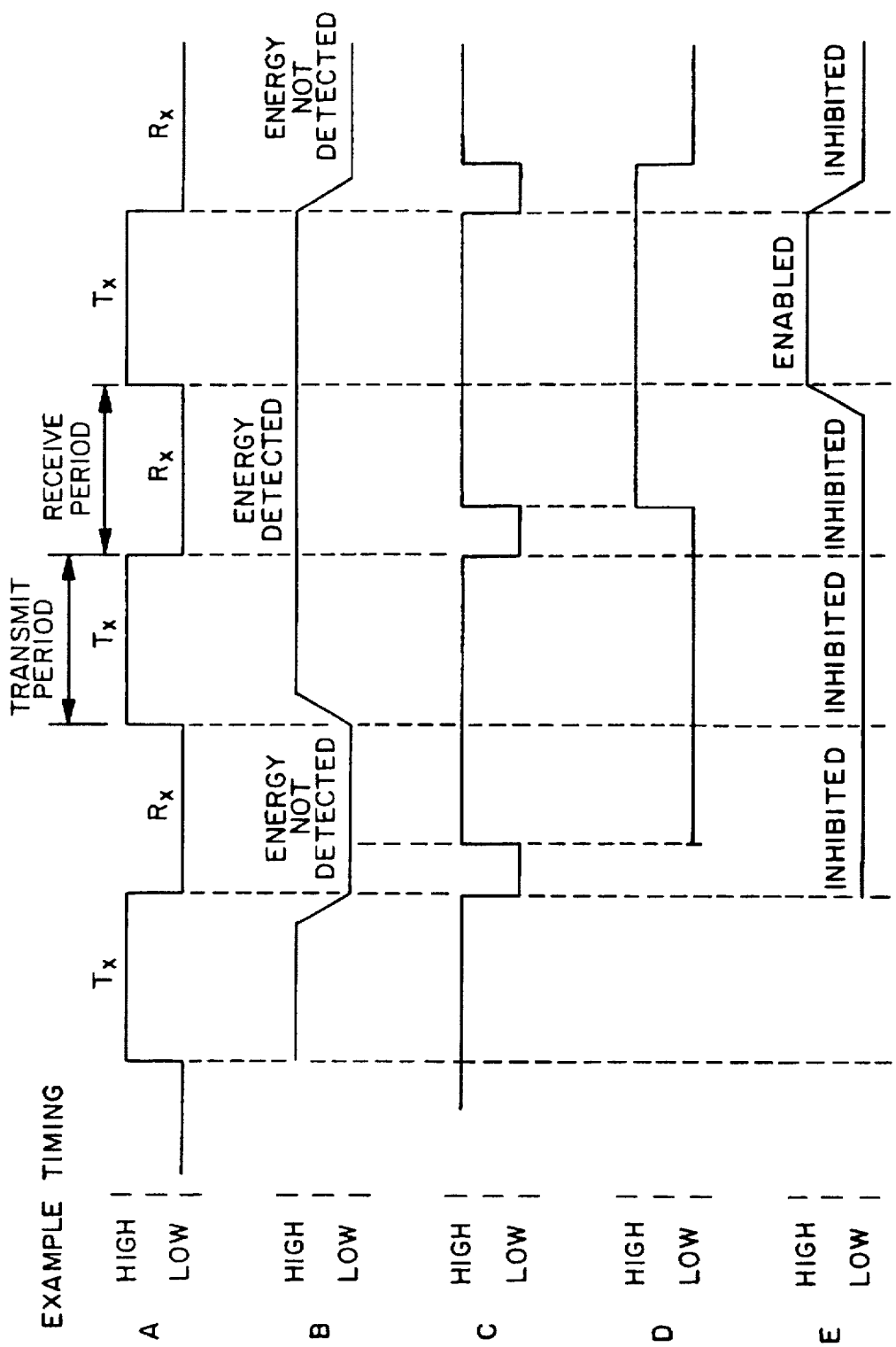
FIG. 5 shows a pulse timing diagram illustrating the operation of the device of FIG. 4.

The waveform of the transmit/receive pulses is shown at A in FIG. 5, and that of the output of the comparator 38 is shown at B.

It will be seen that the falling edge of a transmit period Tx of waveform A causes the output C of the monostable 64 to go low for a period of time which is equal to approximately one half of a receive period Rx. The rising edge of the monostable output waveform C causes the D-type latch 62 to capture the state of the waveform B at that instant.

It is to be noted that the monostable 64 ensures that the instant the decision is made as to the state of the comparator output waveform B is after the transient noise induced by switching from transmit to receive has died away. Likewise, any transient time delays inherent in the filtering action of the energy detector 36 will have passed away.

The state of the waveform B captured by the D-type latch 62 is held by the latch until the next rising edge from the monostable 64 in the next receive period Rx.

The logic circuit in the form of the AND gate 65 inhibits transmission by the transmit section 26 when:

a) the transmit/receive timing waveform A indicates a receive period Rx and b) the output of the D-type latch 62 is low, indicating that in the immediately preceding receive period insufficient energy was detected. Thus, the transmit section 26 is enabled only during the duplexing intervals of the receive signal.

Figure 6:
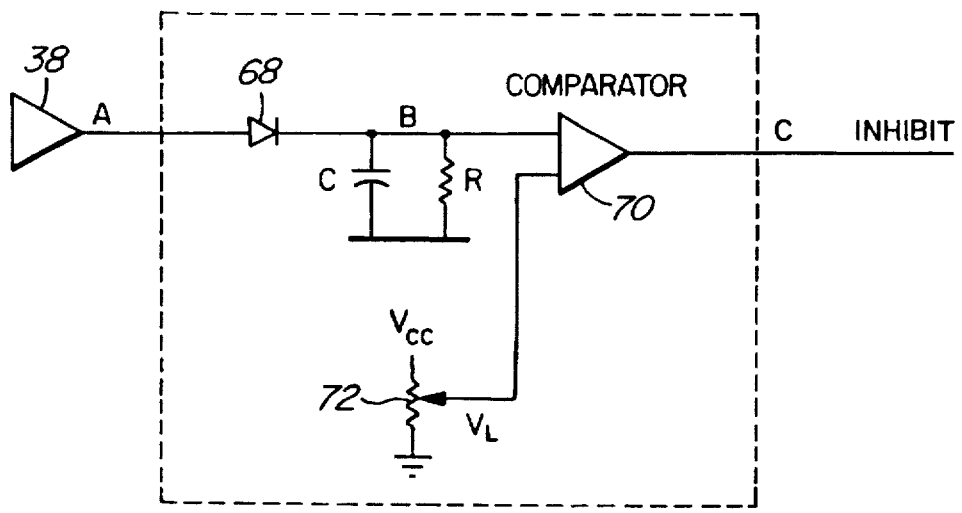
FIG. 6 shows a different inhibit timing and control device for use in the RF repeater part of FIG. 2.
Figure 7:
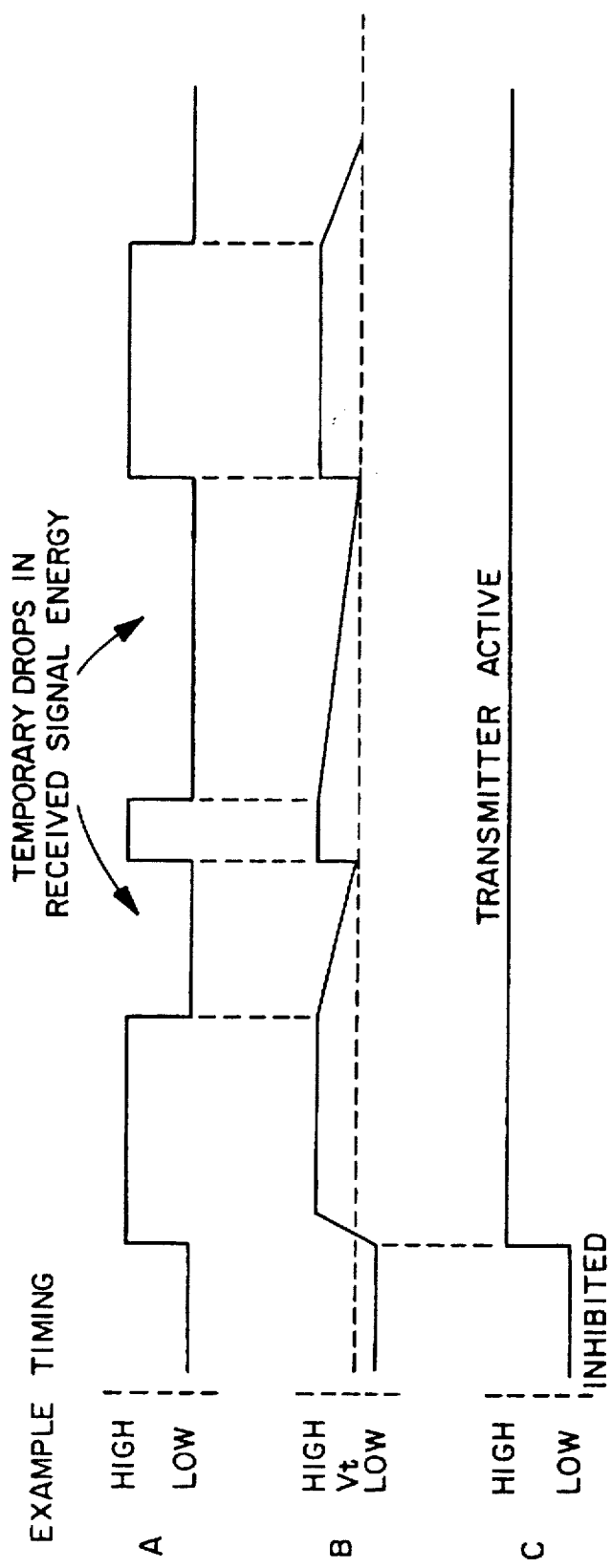
FIG. 7 shows a pulse timing diagram illustrating the operation of the device of FIG. 6.

An alternative inhibit timing and control device, which can be adopted instead of the device 42 when non-time division formats are employed, is shown in FIG. 6. In this case the output from the comparator 38, illustrated by the waveform A of FIG. 7, is used to charge a capacitor C through a diode 68. When this waveform drops to a low state, corresponding to temporary loss of received signal energy, the capacitor C discharges through a resistor R. The values of the capacitor C and the resistor R determine the rate of decrease of the discharge voltage of the capacitor C and are selected so that a second comparator 70, which compares this voltage with a reference voltage from a variable resistor 72, does not inhibit the transmit section 26 for temporary drops in the received signal energy.

With the above-described apparatus according to the present invention, it is not possible for the handset 22, when initiating a call, to ascertain by channel scanning techniques whether a channel is free. It may happen that another handset is using the channel and, although the radio signal spectrum may be free, the associated spectrum in the signal conduit 18 may be occupied.

Conventional methods for enabling an initiating handset to obtain a free channel include beacon assignment and call request assignment, which both require complex circuitry.

The present invention makes possible the use of non-serviced call request/demand assignment.

More particulary, the handset 22 can transmit briefly a signal which does not require servicing by the basestation 10. Reception of this signal will cause the transmission of all signals available to the RF repeaters within a local coverage zone as they now perceive there is "receive energy". Thus, during this epoch, when the transmit sections 26 of all of the second RF repeater parts 16 are enabled, the handset can use demand assigned methods to select a free channel.

Since no response or servicing from the basestation 10 is required, the overall network is simplified.

If the signal from the handset initiating this sequence is on a specially designated channel, then call collisions are unlikely, and they are in any event unimportant if that channel is used exclusively to activate local transmit sections, since the transmit sections would be enabled whether a collision occurs or not.

Figure 8:
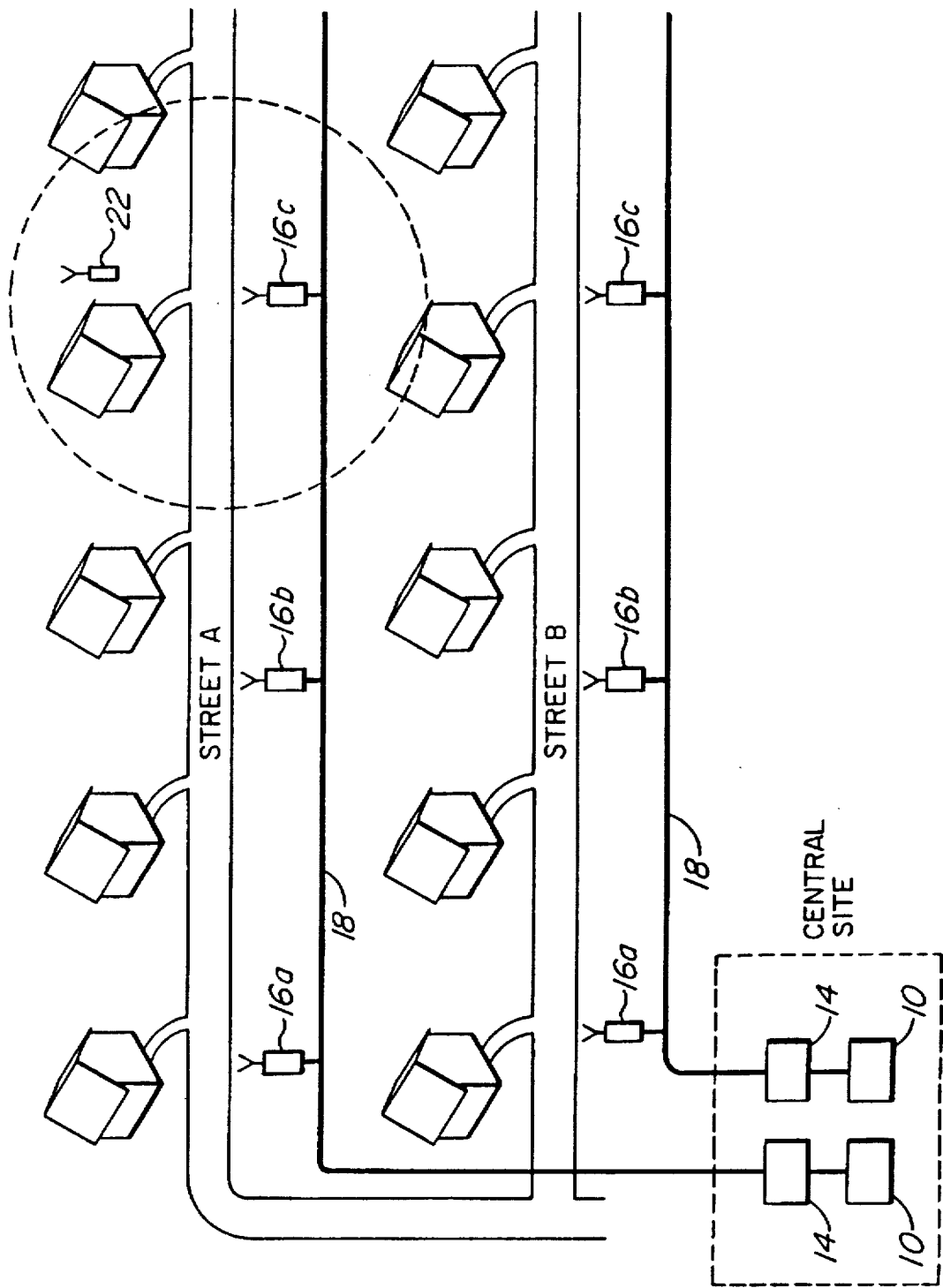
FIG. 8 is a diagrammatic illustration of a pair of RF repeater arrangements according to the present invention associated with a respective pair of streets.

Referring in this connection to FIG. 8, which shows two streets A and B served by separate RF repeater arrangements having separate basestations 10 and basestation interface parts 14, and in which the handset interface parts are indicated by reference numerals 16a–16c, it is noted that, due to the improved radio frequency reuse characteristics afforded by the present invention, the two streets can use the same radio frequency in many locations. Thus, as illustrated in FIG. 8, when a channel is occupied by the handset 22 located as shown in street A, only very limited frequency re-use problems, arising at only the handset interface part 16c in street B exist for street B. Locations around the handset interface parts 16a and 16b of street B are free to re-use the same frequency.

Figure 9:
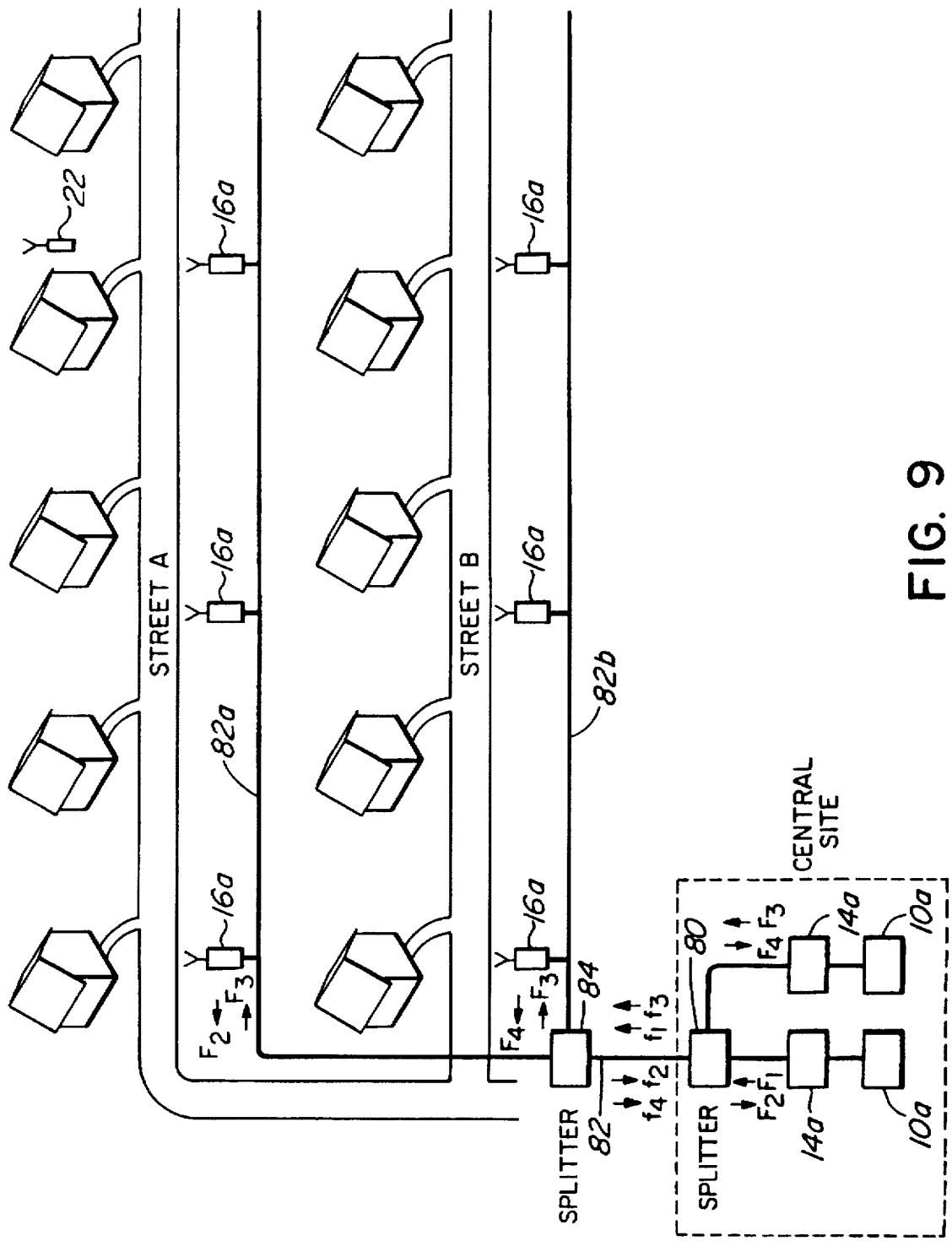
FIG. 9 shows a view corresponding to FIG. 8 but showing a pair of RF repeater arrangements with a common signal conduit.

Another possibility is to segment the signal conduit by frequency planning as shown in FIG. 9. This achieves the same net performance as the arrangement of FIG. 8 but does so by using the cable plant more efficiently than by physically separating streets A and B.

In this case, two basestation interface parts 14a, connected to respective basestations 10a, are connected by a first splitter 80 to a common signal conduit 82, in the form of coaxial cable or optical fiber cable.

The signal conduit 82 is in turn connected through another splitter 84 to two branch signal conduits 82a and 82b which, as can be seen, are provided with respective groups of the handset interface parts 16a and respectively associated with the streets A and B.

In this case, street A uses a band of cable frequencies centred on f1 for signals from the respective basestation 10 to the handset 22 and a cable band centred on f2 for signals from the handset 22 to the respective basestation 10.

For street B the corresponding frequencies are f3 and f4.

Figure 10:
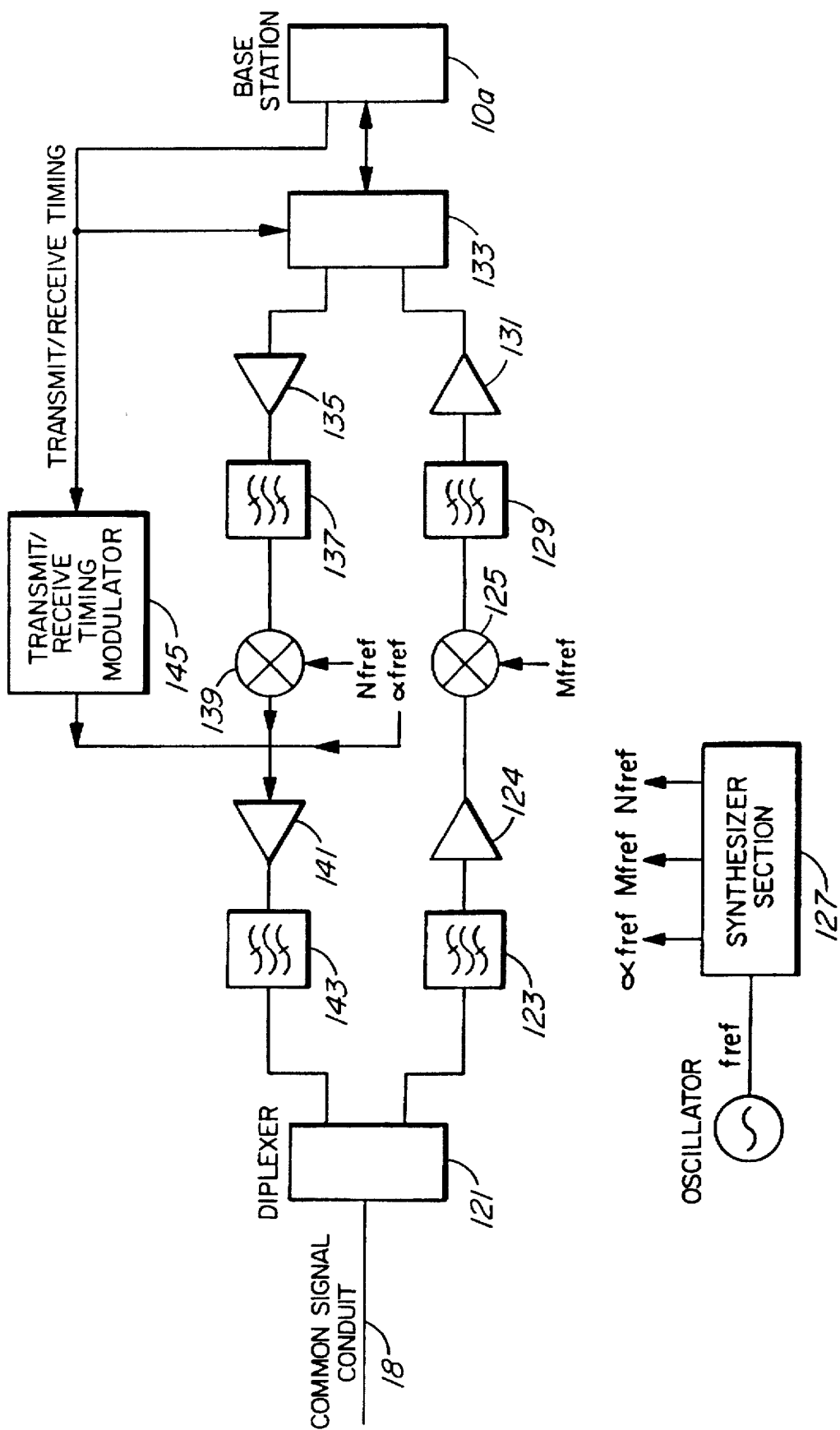
FIG. 10 shows a block diagram of a basestation interface part of one of the Rf repeaters of FIG. 9.
Figure 11:
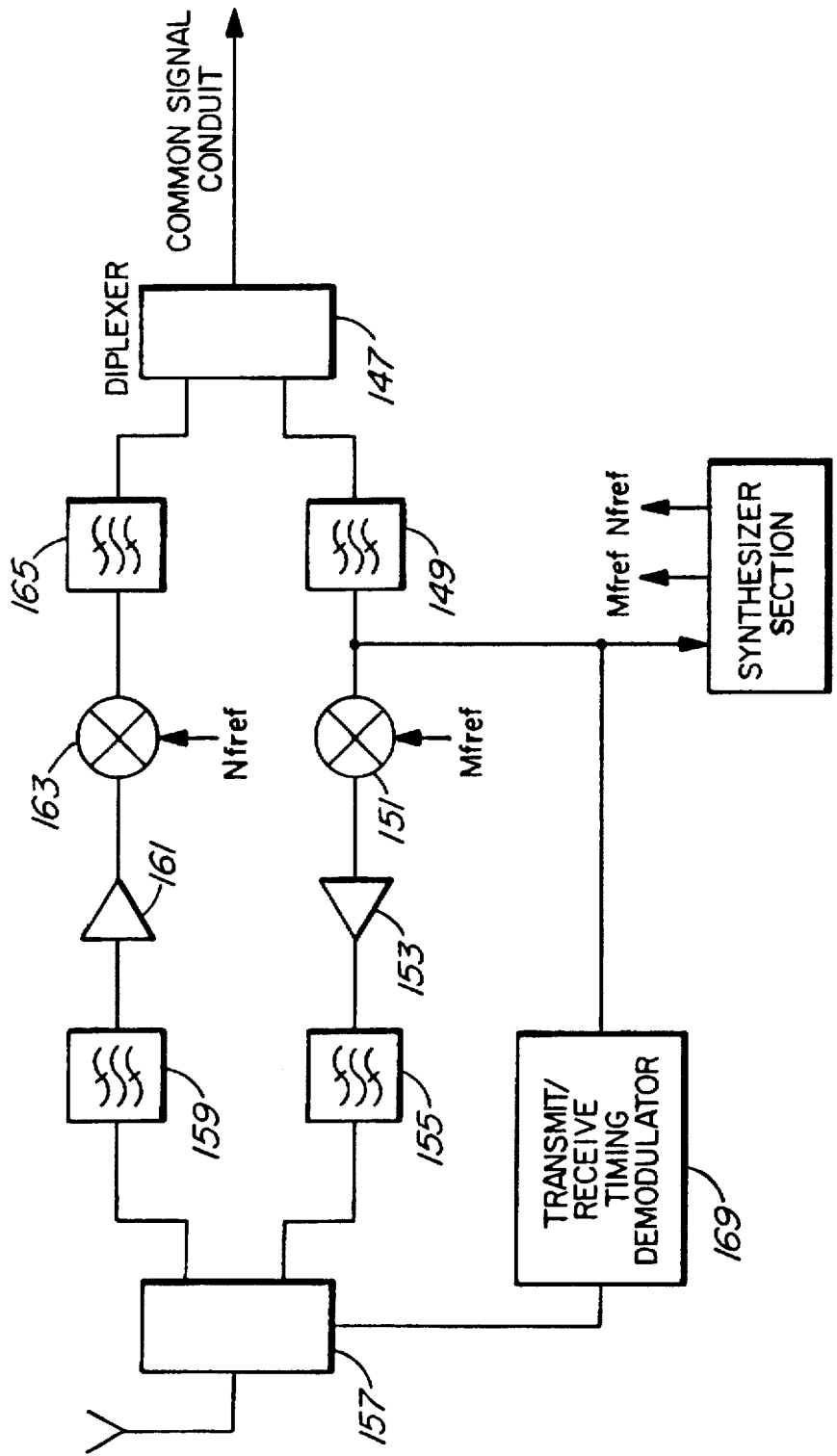
FIG. 11 shows a block diagram of a handset interface part of one of the RF repeaters of FIG. 9.

Such frequencies may be employed by means of the RF repeater parts shown in FIGS. 10 and 11.

One of the first RF repeater components 10a is shown in greater detail in FIG. 10 and has a diplexer 121 connected to the signal conduit. As will be apparent to those skilled in the art, if separate coaxial cables are provided between the first and second RF components for the incoming and outgoing signals, respectively, the diplexer 121 may be omitted. Alternatively, a transmit/receive switch (not shown) may replace the diplexer.

The diplexer 121 has an output connected to a bandpass filter 123 for the receive signal, the output of the bandpass filter 123 being connected to an amplifier 124 which, in turn, is connected to a mixer 125.

At the mixer 125, a frequency Mfref, derived from a reference frequency fref by a synthesizer section 127, is used to heterodyne the signal from one of the second RF repeater components 16a to produce an output signal.

The output signal is passed through a further bandpass filter 129 and a further amplifier 131 to a diplexer or transmit/receive switch 133, the output of which is connected to the respective basestation 10a.

The outgoing signal from the basestation 10a is fed to the diplexer or transmit/receive switch 133, and from there passes through an amplifier 135 and a bandpass filter 137 to a mixer 139.

At the mixer 139, the outgoing signal is heterodyned, using a frequency Mfref, to provide a signal, which is then passed through an amplifier 141 and a bandpass filter 143 to the diplexer 121 for connection to the second RF repeater parts 16a.

As illustrated in FIG. 10, the reference frequency, in the synthesized form αfref, is also passed from the synthesizer section 127 through the amplifier 141 to the second RF repeater parts 16a.

Some signal modulation formats may also require a transmit/receive timing demodulator 145 which, as shown, has an input connected to receive timing pulses (which are also fed to the diplexer transmit/receive switch 133) from the basestation 10a.

One of the second RF repeater components 16a is shown in greater detail in FIG. 11 and has a diplexer 147. As in the case of the diplexer 121, the diplexer 147 may be omitted if two coaxial cables are used, for the incoming and outgoing signals, respectively, or replaced by a transmit/receive switch.

From the diplexer 147, the outgoing signal passes in turn through a bandpass filter 149, a mixer 151, an amplifier 153 and a bandpass filter 155 to a diplexer 157, which may be replaced by a transmit/receive switch (not shown) depending on the modulation format of the handset 22.

At the mixer 151, the frequency Mfref, derived from the signal αfref, is used to heterodyne the outgoing signal.

The incoming or received signal from the diplexer 157 passes through a bandpass filter 59, an amplifier 161, a mixer 163 and a further bandpass filter 165 to the diplexer 147.

At the mixer 163, the frequency Mfref, derived from the frequency αfref, is used to heterodyne the incoming signal.

If required, a transmit/receive timing demodulator 169 may have its output connected to the diplexer 157.

The frequencies Mfref and Mfref, and timing pulses for the demodulator 159, if it is provided, are derived by a synthesizer section 161 from the frequency αref supplied through the coaxial cable 116.

Figure 12:
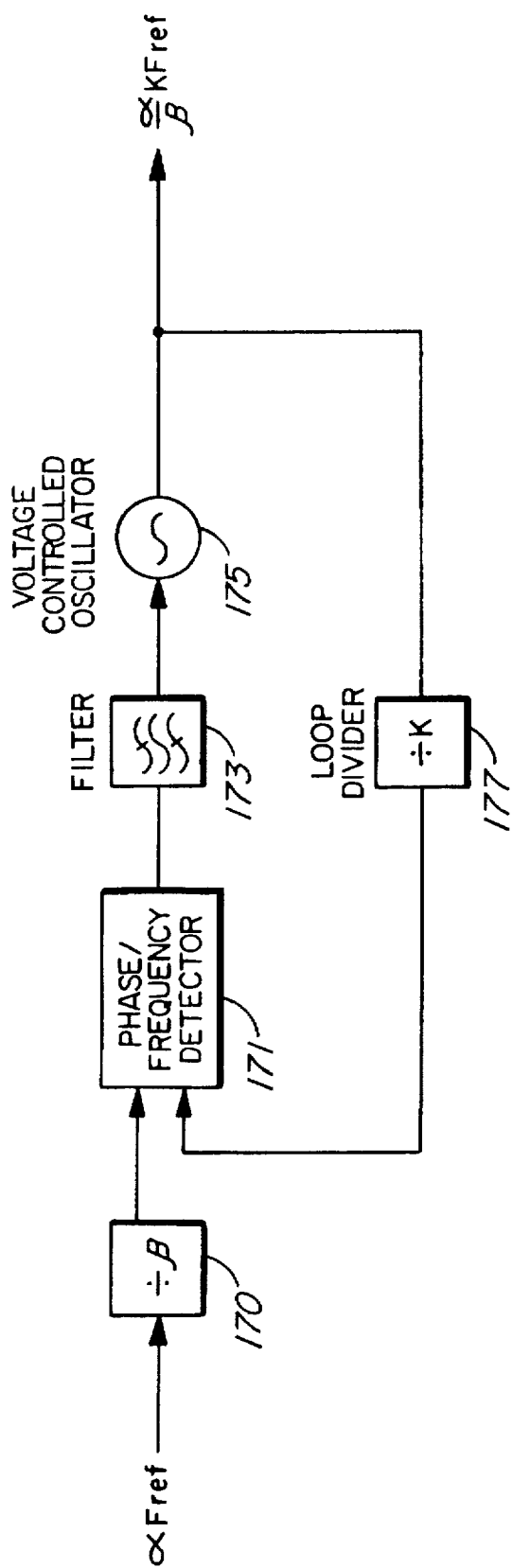
FIGS. 12 and 13 show two different frequency synthesizer sections for the interface parts of FIGS. 10 and 11.
Figure 13:
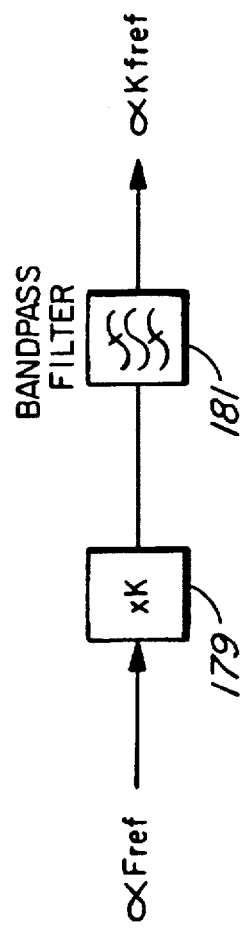

The synthesizer sections 127 and 161 may each be embodied as illustrated in FIGS. 12 and 13.

FIG. 12 shows a frequency divider 170 connected to a phase locked loop comprising a phase/frequency detector 171, a loop filter 173, a voltage controlled oscillator 175 and a loop divider 177.

FIG. 13 shows a frequency multiplication device having a frequency multiplier element 179 and a bandpass filter 181.

As will be apparent to those skilled in the art, various modifications of the present invention may be made within the scope of the invention as defined in the appended claims.

It is, however, pointed out that it is not an object of this invention to conserve power by the muting of the RF repeaters.

I claim:

1. An RF repeater for transmitting a transmit signal within a wireless telephone system incident to receiving a receive signal from a geographically proximate mobile handset, the RF repeater comprising:

a transmit section for broadcasting the transmit signal as a radio signal from the RF repeater to the mobile handset;

a receive section for receiving at the RF repeater the receive signal broadcast as a radio signal by the mobile handset;

a signal energy detector associated with the receive section and responsive to energy levels of the received signal below a predetermined threshold level to provide an inhibit output; and, a control device associated with the transmit section and responsive to the inhibit output for inhibiting the broadcast of the transmit signal by the transmit section, wherein the control device comprises a synchronous circuit for performing a logical and operation on the inhibit output and a timing signal to inhibit the broadcast of the transmit signal by the transmit section.

2. The repeater of claim 1, wherein the synchronous circuit comprises:

a monostable circuit for delaying the timing signal;

a D-type latch for providing a latch output responsive to the inhibit output and incident to a rising edge of the timing signal as delayed by the monostable circuit; and, an and gate for performing a logical and operation on latch output and the timing signal to inhibit the broadcast of the transmit signal by the transmit section.

3. An RF repeater for transmitting a transmit signal within a wireless telephone system incident to receiving a receive signal from a geographically proximate mobile handset, the RF repeater comprising:

a transmit section for broadcasting the transmit signal as a radio signal from the RF repeater to the mobile handset;

a receive section for receiving at the RF repeater the receive signal broadcast as a radio signal by the mobile handset;

a signal energy detector associated with the receive section and responsive to energy levels of the received signal below a predetermined threshold level to provide an inhibit output; and, a control device associated with the transmit section and responsive to the inhibit output for inhibiting the broadcast of the transmit signal by the transmit section, wherein the control device comprises an asynchronous circuit for comparing the inhibit output with a reference signal to inhibit the broadcast of the transmit signal by the transmit section.

4. The RF repeater of claim 3, wherein the asynchronous circuit comprises:

a capacitor for storing energy incident to the inhibit output going high;

a resistor for draining energy from the capacitor incident to the inhibit output going low; and, a comparator circuit for comparing the voltage drop across the resistor with the reference signal to inhibit the broadcast of the transmit signal by the transmit section, wherein the values of the capacitor and the resistor are selected to accommodate temporary drops in the receive signal received by the receive section.

5. The RF repeater of claim 4, further comprising a diode through which the capacitor is charged.

6. The RF repeater of claim 3, wherein the asynchronous circuit comprises a variable resistor coupled between a voltage source and ground to provide the reference signal as the voltage drop over the variable resistor.

* * * * *